US005521845A

United States Patent [19]
Ukon et al.

[11] Patent Number: 5,521,845
[45] Date of Patent: May 28, 1996

[54] ANALYTICAL SYSTEM FOR REMOTE TRANSMISSION OF DATA

[75] Inventors: Juichiro Ukon; Toshihide Sakai; Yasuhiro Nishikata, all of Miyanohigashi, Japan

[73] Assignee: Horiba, Ltd., Kyoto, Japan

[21] Appl. No.: 126,504

[22] Filed: Sep. 24, 1993

[30] Foreign Application Priority Data

Sep. 28, 1992 [JP] Japan .................... 4-282468

[51] Int. Cl.$^6$ .................... G01B 21/00; G05B 19/02; G08C 19/00
[52] U.S. Cl. .................... 364/551.020; 364/920; 340/825.230; 340/825.69
[58] Field of Search ............ 340/825.23, 825.69, 340/825.72; 455/38.1; 341/173; 364/551.02, 920

[56] References Cited

U.S. PATENT DOCUMENTS

| | | |
|---|---|---|
| 4,591,854 | 5/1986 | Robinson .................... 340/825.23 |
| 4,979,506 | 12/1990 | Silvian .................... 340/825.69 |
| 4,988,992 | 1/1991 | Heitschel et al. .................... 340/825.69 |
| 5,021,783 | 6/1991 | Hendrickson et al. .................... 341/173 |
| 5,067,107 | 11/1991 | Wade .................... 364/920 |
| 5,283,570 | 2/1994 | DeLuca et al. .................... 455/38.1 |
| 5,339,361 | 8/1994 | Schwalm et al. . |
| 5,341,166 | 8/1994 | Garr et al. .................... 340/825.72 |
| 5,349,678 | 9/1994 | Morris et al. .................... 364/920 |

Primary Examiner—Eric Coleman
Assistant Examiner—Mark H. Rinehart
Attorney, Agent, or Firm—Price, Gess & Ubell

[57] ABSTRACT

An analytical system capable of analyzing data by means of an analytical machine or tool and providing that analytical data to a computer for processing is provided. A protocol conversion radio machine is provided corresponding to each analytical machine and tool to be controlled and data can be communicated in a wireless manner between the analytical machine and tool and a plurality of computers. The protocol conversion radio machines cannot only mutually communicate with the plurality of computers but also can give and receive control signals to assist in the accumulation and transmission of analytical data between the computers and the analytical machines and tools.

6 Claims, 3 Drawing Sheets

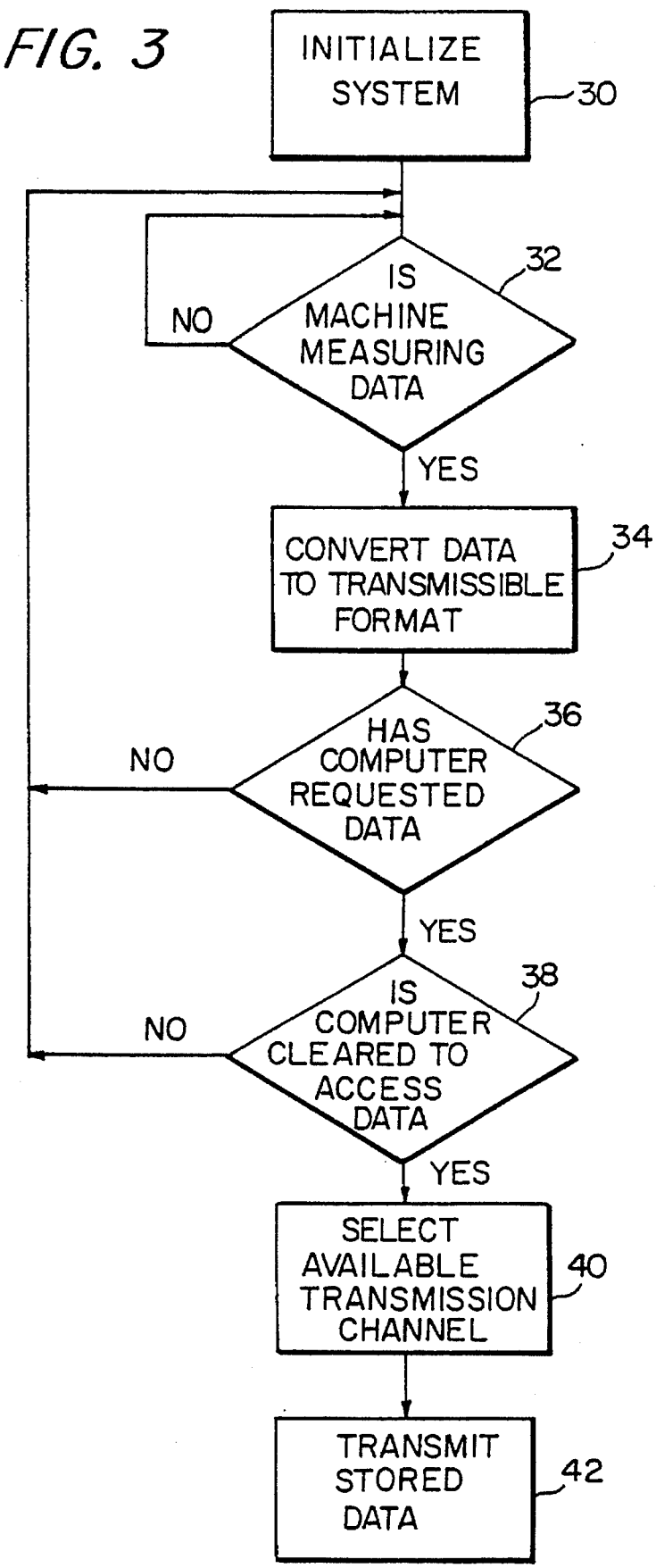

ANALYTICAL SYSTEM FOR REMOTE TRANSMISSION OF DATA

BACKGROUND OF THE INVENTION

1. Field of the Invention

The present invention relates to an analytical system and, in particular, to an analytical system that can store analytical data at the site of an analytical machine or tool and transmit it in a wireless manner upon demand for further processing.

2. Description of Related Art

Various type of measurement instrumentation and analytical tools are increasingly being utilized and frequently require the processing of data from remote locations. Analytical machines and tools can include electrochemical analyzers, photo analyzers, electromagnetic analyzers, particle analyzers, thermal analyzers, gas analyzers, air measuring machines and tools, water quality measuring machines and tools, noise vibration measuring machines and tools, air pollution controllers, water quality environment pollution controllers, various kinds of physical quantity, and physical property measuring devices, material testers and the like.

It is known to use a local area network (LAN) as a communications network for providing data communication within one facility or building and sometimes the analytical data that is acquired from analytical machines and tools are transmitted to personal computers (herein-after referred to as "PASOCOM") and also computers called servers through transmission lines. A server system can be seen in FIG. 2, where analytical data from an analyzer device 24 can be connected with a server 21 through a terminal computer 23. Both the analytical machine and tool 24 and the server 21 and terminal computer 23 can be interlinked with transmission lines 22. As can be appreciated, analytical data can be held in common between each of these stations. In practice, however, the analytical data sent to an analyst is rarely held in common, but is primarily of interest to an individual analyst with particular responsibilities requiring him to collect data and provide an appropriate report. In such cases, a LAN system in which the servers 21, a plurality of terminal computers 23, and a plurality of analyzers 24 connected through hard wire transmission lines can be too expensive, complicated, and wasteful of resources.

Accordingly, the prior art is still looking for ways to secure and process remotely acquired data in an economical manner.

SUMMARY OF THE INVENTION

It is an object of the present invention to provide an analytical system that is capable of analyzing a sample by means of an appropriate analytical machine or tool and securing data resulting from such an analysis and then optionally making the analytical data available by transmission to a computer belonging to an analyst interested in that specific data.

To achieve the purpose of the present invention, a protocol conversion radio system is provided corresponding to each of a plurality of analytical machines and tools to control a corresponding analytical machine and tool and to enable data to be sent from an analytical machine and tool through the protocol conversion radio system. The protocol conversion radio systems are adapted to be mutually communicable with a plurality of computer systems through a wireless transmission and are capable to transmit and receive control signals and analytical data among the computers and the analytical machines and tools. As a result of the present invention, the analytical machines and tools can be wirelessly connected with the computers through the protocol conversion radio system so that an analyst can address the analytical machines and tools to obtain the analytical data and also send control instructions for an analysis to such machines on the basis of the analytical data in a separate facility or study room from that of a laboratory, even if the analytical machines and tools are remotely positioned in the laboratory. The protocol conversion radio systems also function as a converter corresponding to specific analytical machines and tools so that even an analytical machine and tool that is different in protocol can still communicate with another instrument by use of the same protocol by a conversion that can be implemented by software installed on a computer system. An analyst can achieve the purposes of the present invention by utilizing a note-type PASOCOM in his possession within a range wherein radio communication is possible and the note-type PASOCOM can communicate with the analytical machines and tools directly.

As can be appreciated, the analytical machines and tools used in the present invention can include various kinds of analytical machines and tools, such as electrochemical analyzers, photo analyzers, electromagnetic analyzers, partition analyzer, thermal analyzers, gas analyzers, air-measuring machines and tools, water quality measuring machines and tools, noise vibration measuring machines and tools, air pollution controllers, water quality environment pollution controllers, various kinds of physical quantity physical property measuring devices and material testers.

While PASOCOM and the like are one example of computers that can be used in the present invention, it can be readily recognized that the present invention is not limited to a specific computer system and that various computer systems are capable of displaying recorded analytical data and measuring data when appropriately interconnected with the protocol conversion radio system.

The protocol conversion radio systems as used in the present invention function as converters corresponding to the specified analytical machines and tools so that semiconductor elements, such as IC cards and ROM chips and software holding medium, such as floppy disk and magnetic tapes, are preferably utilized.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3 is a flowchart of one embodiment of data transmission.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved analytical system for remote transmission of data at the demand of the analyst.

The preferred embodiments of the present invention will be described herein with reference to the drawings.

Figure 1:
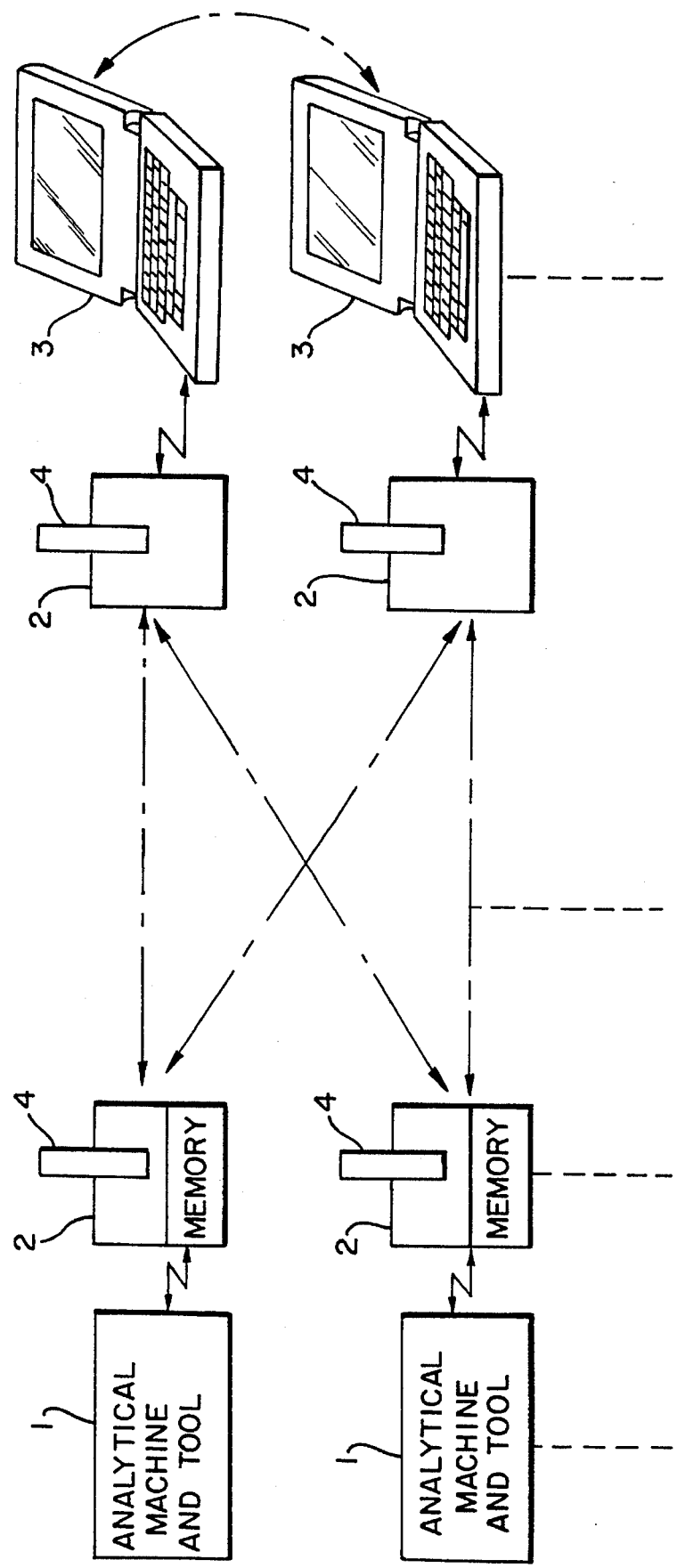
FIG. 1 is a schematic drawing showing one example of the construction of an analytical system according to the present invention.
Figure 2:
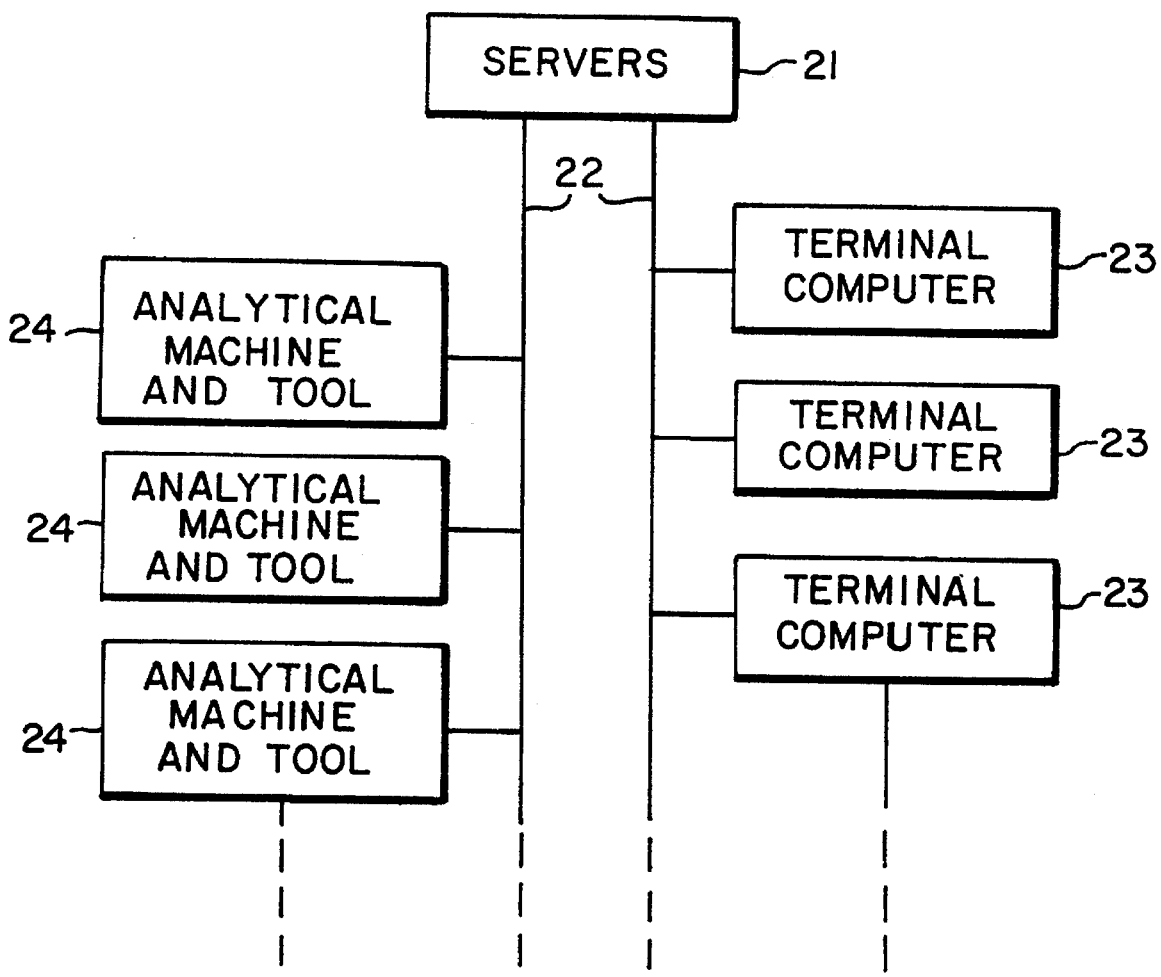
FIG. 2 is a schematic drawing showing the construction of a conventional analytical system.

FIG. 1 shows one example of an embodiment of an analytical system according to the present invention. An analytical machine or tool 1 can comprise any one of the following instruments, such as electrochemical analyzers, photo analyzers, electromagnetic analyzers, partition analyzer, thermal analyzers, gas analyzers, air-measuring machines and tools, water quality measuring machines and tools, noise vibration measuring machines and tools, air pollution controllers, water quality environment pollution controllers, various kinds of physical quantity physical property measuring devices and material testers.

In practice, N analytical machines and tools are provided. A protocol conversion radio machine or system 2 corresponding to each of the analytical machines and tools 1 is also incorporated into the system. Consequently, the number of protocol conversion radio machines 2 will be n. As shown in FIG. 1, the respective protocol conversion radio systems 2 are connected with a corresponding analytical machine and tool 1 through an appropriate hard wire connection, such as the double arrow lines disclosed in FIG. 1.

A computer system 3 is capable of being mutually communicated with the n number of protocol conversion radio systems 2, respectively, through wireless means, which have been schematically disclosed as the double arrow dotted lines in FIG. 1. A computer system 3 may be, for example, a PASOCOM system provided in a study room or work room with a corresponding PASOCOM system provided in a laboratory or production facility wherein the analytical machines and tools 1 are located. Alternatively, a notebook-type PASOCOM system can be maintained in the analyst's position. Each of these computers are adapted to mutually communicate with each other through the wireless means shown by the double arrow dotted lines in FIG. 1. The computers 3 can integrate a wireless transmission capability within their housing to receive and transmit data within a limited range.

Alternatively, as shown in FIG. 1, the radio systems 2 can be connected to the respective computers 3 by a hard wire interface.

The analytical machines and tools 1 can gather and store the analytical data in the normal course of their operation. For example, analyzed data can be converted to digital data, then stored for subsequent transmission. This analytical data can then be transmitted to the protocol conversion radio machine 2 associated with the analytical machine and tool 1 in different ways to effectuate the purposes of the present invention. For example, the analytical operation itself can be controlled by the protocol conversion radio machine 2. The protocol conversion radio machine 2 can be adapted to correspond to various kinds of communication formats, such as GP-1B and RS-232C.

Thus, as can be seen in FIG. 3, a software program that is expressly designed to be compatible with a particular analytical machine can be installed in a microprocessor system with the radio machine 2 to send data. The program can be in a passive state until addressed by a request from a computer 3. Then the system can be initialized at step 30 and the status of the machine can be determined at step 32. Any data can be converted to an appropriate transmissible format, e.g., analog-to-digital, and then formatted for transmission at step 34. If the computer 3 requests the data at step 36, a security check can be performed at step 38 and an appropriate transmission channel selected at step 40 for transmitting the stored data at step 42.

Obviously, various changes in this procedure can be implemented while preserving the low cost, economical wireless system of the present invention.

Since different analytical machines and tools can be different in the output of their signals, both as to format and signal level, the protocol conversion radio machine 2 can have a conversion function so that the output manner and protocol of a particular analytical machine and tool may be matched with a protocol of a computer 3. This function can be achieved by means of software and since a large number of machines can be potentially handled, the different protocol conversion radio machines can correspond to converters between a specific analytical machine and tool, and the computer 3, by being provided with a removable semiconductor elements, such as an IC card and ROM chip, or software mediums, such as a floppy disk and magnetic tape, to enable the individual protocol conversion radio machines to be adapted to specific analytical machines. Thus, the protocol conversion radio machines 2 can convert their protocol of the analytical machines and tools 1 to the protocol and data format of the particular computer system 3 in accordance with software 4 memorized in a software retention medium 4.

In addition, the protocol radio conversion machines 2 can have multiple radio channels and can simultaneously communicate with a plurality of computers 3. The protocol conversion radio machines 2 and the computers 3 be capable of detecting which radio channels are being used at the present time and can search for unengaged channels at the beginning of a communication in which to conduct the data communication. Thus, the protocol conversion radio machine 2 can have a scanner function to scan for an nonutilized channel and then establish a communication of data using that channel. As can be appreciated, the wireless link with the computer 3 has the same capability for identification of the channel and identification of the specific analytical machine so that communication between the protocol conversion radio machine 2 and the computer 3 can call up the other unit or party from either side and both the protocol conversion radio machine 2 and the computers 3 can simultaneously communicate data with a plurality of different objects. A plurality of analytical machines and tools 1 can be advantageously interconnected with a plurality of computers 3 by a wireless connection through the protocol conversion radio machines 2 so that the analytical machines and tools 1 can be operated by instructions from the computers 3, or even instructions from the analytical machines and tools 1, e.g., that sufficient data has been accumulated, to thereby wirelessly transmit the analytical data at an appropriate time period. Thus, the analyst can easily receive analytical data on his own computer 3 by bringing the computer in his possession, for example, a notebook-type PASOCOM computer, within the receiving range where radio communication is possible. As a result of the present invention, there is no necessity for reconnection of electric lines in a conventional analytical system and the hard wiring of analytical machines and tools 1 for connection with computers 3 can be eliminated. Additionally, the protocol conversion radio machines 2 can easily adapt to different analytical machines and tools 1 and the analyst can easily receive various analytical data in the computer 3 in his possession. Thus, the analysts is not required to be on site at the location of the analytical machines and tools 1 to adjust the analytical data. For example, the analyst can adjust the analytical data in his own study room or work environment. Furthermore, even though there are many analysts, one analytical machine and tool 1 can be connected with a large number of computers 3, so that the analytical machines and tool 1 are not occupied in the time when the analytical data is being adjusted. In addition, the computers 3 can also mutually communicate between themselves so that analytical data can be exchanged. In accordance with the present invention, a large number of analysts can optionally receive the necessary analytical data in their own computers without disturbing the analytical operations of other analysts and it is not required, as in a conventional wired network, that electrical lines be connected and disconnected and that a high-priced, high performance computer be utilized. The analytical machines and tools can be inexpensively and simply networked through the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A wireless data transmission system for analytical machines comprising:

a plurality of analytical machines for providing and storing measurement data related to a measurement operation performed by a respective analytical machine at remote locations;

a plurality of computer systems for receiving and processing the measurement data from the analytical machines;

means for providing a security verification of a computer system access to any measurement data prior to releasing measurement data from an analytical machine; and a plurality of wireless transmitting systems connected to the analytical machines and the plurality of computer systems for transmitting and receiving the measurement data between the analytical machines and the computer systems, the wireless transmitting systems including means for identifying a specific computer system and transmitting and receiving from that specific computer system, and means for converting the measurement data to a format suitable for transmission.

2. The invention of claim 1 wherein the means for converting the data to a format suitable for transmission includes a memory member capable of storing a software program.

3. The invention of claim 2 wherein the memory member includes a semiconductor memory element.

4. A selective information transmission system for recording and transmitting measurement data produced by analytical machines, comprising:

a plurality of analytical measurement machines for providing measurement data;

means for determining if an analytical measurement machine is measuring data and if measuring data, converting the measurement data into a transmissible format and storing it adjacent the analytical measurement machine;

a plurality of computer systems for receiving and processing data; and a wireless transmitting system provided for each computer system and for each analytical measurement machine, including means for sending a request from a specific computer system to provide measurement data and means responsive to the request for performing a security verification and to forward the stored transmissible format measurement data to the requesting computer system.

5. The selective information transmission system of claim 4, including a plurality of wireless transmission channels available on the wireless transmitting systems and means for measuring the transmission channels to select an available transmission channel.

6. The selective information transmission system of claim 5, wherein the wireless transmitting system includes a radio receiver and transmitter.

* * * * *